Oct. 15, 1963   G. W. RUANE   3,107,128
REMOVABLE TRACK AND TIRE ASSEMBLY FOR A VEHICLE
Filed May 12, 1961

INVENTOR.
GEORGE W. RUANE
BY Pearce & Schaeperklaus
ATTORNEYS

United States Patent Office 3,107,128
Patented Oct. 15, 1963

3,107,128
REMOVABLE TRACK AND TIRE ASSEMBLY
FOR A VEHICLE
George W. Ruane, 3508 Erie Ave., Cincinnati 8, Ohio
Filed May 12, 1961, Ser. No. 115,848
3 Claims. (Cl. 305—35)

This invention relates to supporting tires and tracks for heavy vehicles. More particularly, this invention relates to a removable track for a vehicle and to a tire construction adapted to cooperate with the removable track.

An object of this invention is to provide a removable belt-type track which can be mounted on tires of a heavy vehicle to assist the vehicle in traversing soft or slippery areas.

A further object of this invention is to provide a track of this type which runs on a plurality of tandem-mounted tires of the vehicle.

A further object of this invention is to provide such a removable track having internal ribs which seat in and mesh with grooves in tires of the vehicle to lock the track to the tires so that the driving traction of the wheels on which the tires are mounted is transferred to the track.

A further object of this invention is to provide a track of this type in which ends of the track are releasably linked together by fasteners which are so spaced from the ribs as to fall into the grooves.

A further object of this invention is to provide a track of this type adapted to run on a plurality of tires mounted in groups on a pair of tandem-spaced axles with a pair of closely spaced tires mounted on wheels on each axle, the track having a lengthwise rib which falls in the space between tires of each pair to prevent sidewise slipping of the track.

The above and other objects and features of the invention will be apparent to those skilled in the art to which this invention pertains from the following detailed description and the drawing, in which.

In the following detailed description and the drawing like reference characters indicate like parts.

Figure 1:
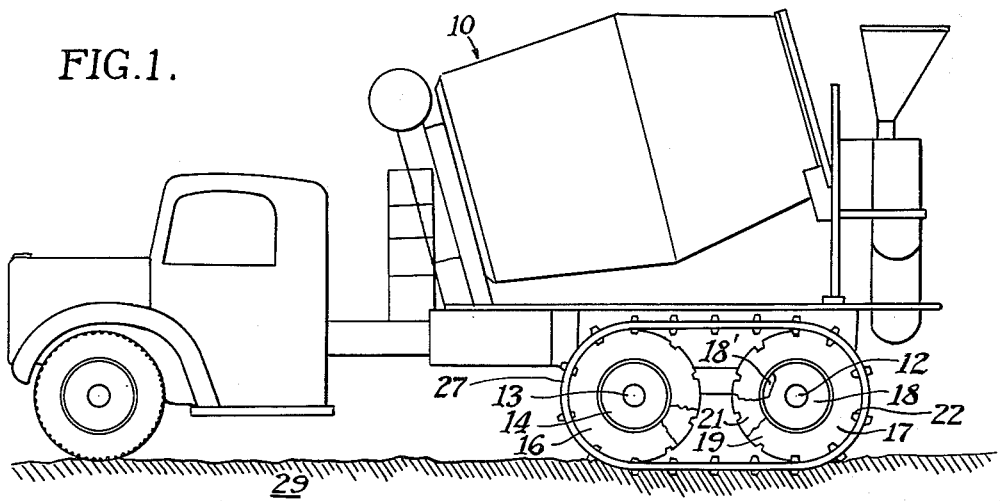
FIG. 1 is a view in side elevation showing a concrete-mixing truck equipped with a removable belt-track constructed in accordance with an embodiment of this invention, portions of tires and wheels thereof being broken away to reveal tires and wheels there-behind.
Figure 2:
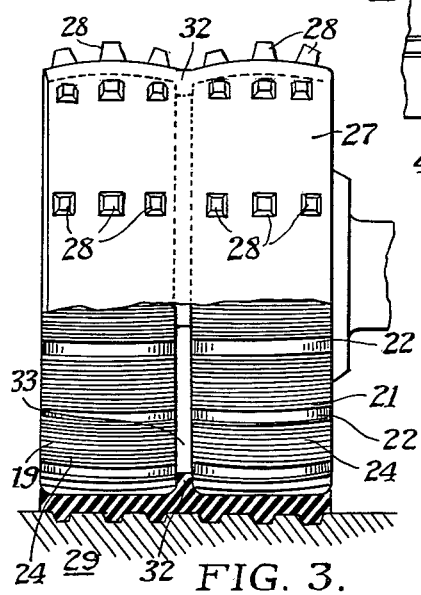
FIG. 2 is an enlarged view in rear elevation of the wheels and track, a portion of the track being broken away to reveal details of construction.
Figure 6:
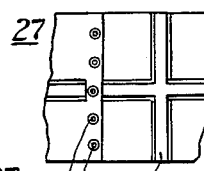
FIG. 6 is a fragmentary view of the track taken in the direction of the arrows 6—6 in FIG. 4.
Figure 4:
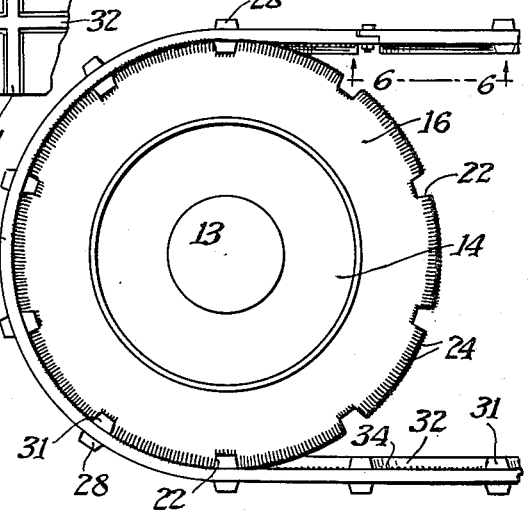
FIG. 4 is an enlarged fragmentary view in side elevation showing one wheel, one tire, and a fragmentary portion of the track.
Figure 3:
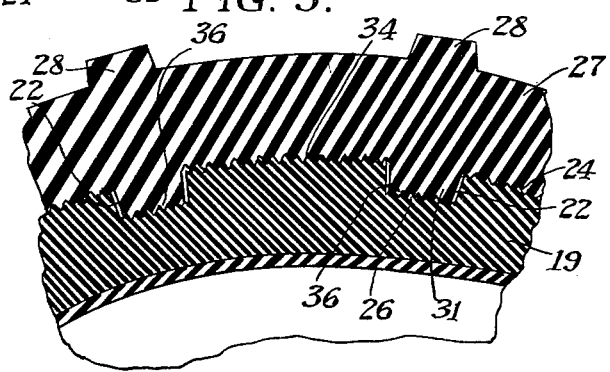
FIG. 3 is an enlarged fragmentary view in vertical section showing details of construction of the track and of one of the tires on which the track is mounted.

In FIG. 1 is illustrated a conventional concrete mixing truck 10 having rear axles 12 and 13 arranged in tandem relationship. On the axle 13 are mounted wheels 14 and 15 which carry tires 16 and 17. On the axle 12 are mounted wheels 18 and 18' on which tires 19 and 21 (FIG. 2) are mounted. As shown most clearly in FIGS. 2 and 3, each of the tires is provided with a plurality of transverse grooves 22, which are equally spaced radially. In addition, as shown in FIG. 3, the surface of each tire is provided with transversely extending serrations 24 on the face thereof and similar serrations 26 on the faces of the grooves thereof.

During normal operation of the truck 10, the tires are exposed. However, when the truck approaches an area when the ground is wet and soft or slippery, a removable belt-track 27 is mounted on the tires. The track 27 can be formed of materials similar to those from which vehicle tires are formed and can include fabric plies or the like on which rubber is molded so that the track is flexible but of strong construction. On the outer face of the main body strip of the track are mounted lugs 28 which grip the ground 29 to improve traction. On the inner face of the track are molded transverse ribs 31 which are spaced such a distance that, when the track is mounted on the tires, the ribs 31 can mesh with the transverse grooves 22 of the tires. In addition a lengthwise rib 32 is molded on the inner face of the track. The lengthwise rib 32 is received in a space 33 between tires to prevent sidewise slipping of the track. As shown in FIG. 3, the inner face of the track is provided with transverse serrations 34 which correspond with the serrations of the tire to give a firm grip between the belt and tire. Similar transverse serrations 36 on the ribs 31 cooperate with the serrations 26 of the grooves 22 of the tires.

Figure 5:
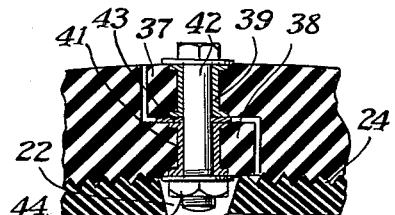
FIG. 5 is an enlarged view in upright section showing ends of the track and a fragmentary portion of one tire.

Ends of the track are provided with tongues 37 and 38 (FIG. 5) which are offset and adapted to overlap. Grommets 39 and 41 disposed in the tongues 37 and 38, respectively, receive fastener bolts 42. Spacers or washers 43 can be mounted on the bolts between grommets. Nuts 44 mounted on the bolts 42 hold the ends of the track in assembled relation. The tongues 37 and 38 can be so spaced from the ribs 31 that when the ribs mesh with the grooves 22 of the tires, the bolts fall in one of the grooves as shown in FIG. 5.

The track can be installed on the tire when the truck is about to leave a highway and enter an area where difficulty can be anticipated. The track gives substantially increased traction and added support inhibiting sinking of the truck into the ground.

The track and tire structure illustrated in the drawing and described above are subject to structural modification without departing from the spirit and scope of the appended claims.

Having described my invention, what I claim as new and desire to secure by Letters Patent is:

1. In combination with a vehicle having a pair of axles arranged tandemwise, a pair of wheels mounted on each of said axles, a tire mounted on each of said wheels, each of said tires having radially spaced transverse grooves, the tires of the wheels on each axle being closely spaced, and a removable track of flexible material mounted on said tires, said track including a main body strip overlying outer faces of the tires, transverse ribs on an inner face of the main body strip meshing in the transverse grooves of the tires, a lengthwise rib spaced from lengthwise edges of the main body strip for being received in the spaces between tires, and releasable coupling means at ends of the main body strip for connecting the ends together, the coupling means being so spaced from the transverse ribs as to mesh with transverse grooves of the tires, an end portion of the coupling means being received in the transverse grooves.

2. In combination with a vehicle having a pair of axles arranged tandemwise, a wheel mounted on each of said axles, a tire mounted on each of said wheels, each of said tires having radially spaced transverse grooves, and a removable track of flexible material mounted on said tires, said track including a main body strip overlying outer faces of the tires, transverse ribs on an inner face of the main body strip meshing in the transverse grooves of the tires, and releasable coupling means at ends of the belt for connecting the ends together, the coupling means being so spaced from the tranverse ribs as to mesh with transverse grooves of the tires, an end portion of the coupling means being received in the transverse grooves.

3. In combination with a vehicle having a pair of axles arranged tandemwise, a pair of wheels mounted on each of said axles, a tire mounted on each of said wheels, each of said tires having radially spaced transverse grooves, the tires of the wheels on each axle being closely spaced and a removable track of flexible material mounted on said tires, said track including a main body strip overlying outer faces of the tires, transverse ribs on an inner face of the main body strip meshing in the transverse grooves of the tires, a lengthwise rib spaced from lengthwise edges of the main body strip for being received in the spaces between tires, there being overlapping tongues at ends of the main body strip, and releasable coupling members connecting the tongues together, the coupling members being so spaced from the transverse ribs as to mesh with transverse grooves of the tires, an end portion of the coupling means being received in the transverse grooves.

References Cited in the file of this patent

UNITED STATES PATENTS

| | | |
|---|---|---|
| 2,661,251 | Bonmartini | Dec. 1, 1953 |
| 2,898,965 | Eddy | Aug. 11, 1959 |
| 2,977,158 | Iblings | Mar. 28, 1961 |

FOREIGN PATENTS

| | | |
|---|---|---|
| 1,151,060 | France | Oct. 19, 1957 |